United States Patent
Judge et al.

(10) Patent No.: US 11,431,855 B1
(45) Date of Patent: *Aug. 30, 2022

(54) ENCODER POOLS FOR CONFERENCED COMMUNICATIONS

(71) Applicant: 8x8, Inc., Campbell, CA (US)

(72) Inventors: Garth Judge, Campbell, CA (US); James Kleck, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,871

(22) Filed: Feb. 16, 2021

Related U.S. Application Data

(63) Continuation of application No. 16/874,438, filed on May 14, 2020, now Pat. No. 10,924,613, which is a continuation of application No. 16/559,203, filed on Sep. 3, 2019, now Pat. No. 10,659,615, which is a continuation of application No. 16/108,628, filed on Aug. 22, 2018, now Pat. No. 10,404,862.

(51) Int. Cl.
| | |
|---|---|
| *H04M 3/56* | (2006.01) |
| *H04R 3/00* | (2006.01) |
| *H04L 29/06* | (2006.01) |
| *H04L 65/403* | (2022.01) |

(52) U.S. Cl.
CPC .......... *H04M 3/568* (2013.01); *H04L 65/403* (2013.01); *H04M 3/567* (2013.01); *H04R 3/005* (2013.01)

(58) Field of Classification Search
CPC ........ H04M 3/568; H04M 3/567; H04M 3/56; H04R 3/005; H04L 65/403
USPC ............. 379/202.01, 201.01, 203.01, 204.01
See application file for complete search history.

(56) References Cited

U.S. PATENT DOCUMENTS

| | | |
|---|---|---|
| 5,953,049 A | 9/1999 | Horn et al. |
| 6,989,856 B2 | 1/2006 | Firestone et al. |
| 7,477,282 B2 | 1/2009 | Firestone et al. |
| 7,970,150 B2 | 6/2011 | Oxford |
| 7,991,167 B2 | 8/2011 | Oxford |
| 8,659,636 B2 | 2/2014 | Firestone et al. |
| 9,554,091 B1 | 1/2017 | Malegaonkar et al. |
| 9,955,280 B2 | 4/2018 | Jarvinen et al. |
| 10,404,862 B1 | 9/2019 | Judge et al. |
| 10,659,615 B1 | 5/2020 | Judge et al. |

(Continued)

OTHER PUBLICATIONS

Standard 3GPP2 C S0014-D "Enhanced Variable Rate Codec, Speech Service Options 3, 68, 70, and 73 for Wideband Spread Spectrum Digital Systems", Version 3.0, Oct. 2010, 318 pages.

(Continued)

*Primary Examiner* — Thjuan K Kaddy
(74) *Attorney, Agent, or Firm* — Crawford Maunu PLLC

(57) ABSTRACT

Various example implementations are directed to methods and apparatuses for facilitating conferenced communications. In one of various examples involving audio signals received from a plurality of participants of a digital audio conference, a logic circuit is to process the audio signals via respective audio input circuits respectively associated with each of the endpoint devices, and, in response to a subset of the different audio signals deemed or qualified as having a loudest audio input as compared to other ones of the different audio signals, each of the other ones of the different audio signals are assigned to an encoder pool based on a codec associated with the digital audio conference.

22 Claims, 4 Drawing Sheets

(56) References Cited

U.S. PATENT DOCUMENTS

| | | |
|---|---|---|
| 2005/0078170 A1 | 4/2005 | Firestone et al. |
| 2005/0078171 A1 | 4/2005 | Firestone et al. |
| 2005/0248652 A1 | 11/2005 | Firestone et al. |
| 2006/0256974 A1 | 11/2006 | Oxford |
| 2006/0262943 A1 | 11/2006 | Oxford |
| 2011/0217021 A1* | 9/2011 | Dubin ............... H04N 7/147 386/278 |
| 2013/0216206 A1 | 8/2013 | Dubin et al. |
| 2014/0347565 A1 | 11/2014 | Fullum et al. |
| 2016/0105543 A1 | 4/2016 | Ponting et al. |
| 2016/0295539 A1 | 10/2016 | Atti et al. |
| 2017/0111408 A1 | 4/2017 | Blake |

OTHER PUBLICATIONS

A. Spanias. "Advances in speech and audio processing and coding," 2015 6th International Conference on Information, Intelligence, Systems and Applications (IISA), Corfu, 2015 (Abstract only).

* cited by examiner

ENCODER POOLS FOR CONFERENCED COMMUNICATIONS

OVERVIEW

Aspects of various embodiments are directed to encoder pools for conferenced communications, and more particularly, to facilitating conferenced communications using encoder pools.

Networking architectures and the field of audio and/or audio-video conferencing have grown increasingly complex in communications environments. In addition, the augmentation of clients or end users wishing to communicate in such environments have caused many networking configurations and systems to respond by adding elements to accommodate the increase in networking traffic. Communication tunnels or links may be used in order to establish a communication flow, whereby an end user or an object may initiate a video or an audio session to facilitate a particular call or conference.

Communications devices such as telephones and/or speakerphones may be used to mediate conversations between local persons and remote persons. Such communications devices may have a microphone to pick up the voices of the local persons (in the environment of the speakerphone), and, a speaker to audibly present a replica of the voices of the remote persons. While such communications devices may allow a number of people to participate in a conference call, a number of issues may make it difficult for participants of the conference call to hear audio from those speaking. The microphone of the communications devices may pick up not only the voices of the local persons, but also the signal transmitted from the speaker and its reflections off of acoustically reflective structures in the environment. Additionally, sometimes one or more of the local persons may be speaking at the same time, making it difficult to hear a participant in a conference call with a plurality of participants. Yet further, encoding the audio signals from each respective participant of a conference call is data intensive, thereby increasing the computing resources needed and the time needed to transmit communications between the various participants.

Generating digital audio for a conference call can include a number of steps. First, for each participant, encoded audio packets are read from the network, and for each participant of the conference call the audio packets are decoded. For each participant, the decoded audio is mixed for all other participants, and for each participant, the mixed audio is encoded into packets. Encoding the mixed audio into packets can be a cycle intense process, particularly for conferenced communications including a large number of participants and/or for conferenced communications utilizing differing codecs. A codec refers to or includes a device or computer program for encoding or decoding a digital data stream or signal. A codec encodes a data stream or a signal for transmission and storage, possibly in encrypted form, and the decoder function reverses the encoding for playback or editing. Codecs are used in videoconferencing, streaming media, and video editing applications.

These and other matters have presented challenges to efficiencies of facilitating conferenced communications, for a variety of applications.

SUMMARY

Various example embodiments are directed to issues such as those addressed above and/or others which may become apparent from the following disclosure concerning facilitating conferenced communications among a plurality of participants.

In certain example embodiments, aspects of the present disclosure involve facilitating conferenced communications using encoder pools. In a more specific example embodiment, methods for facilitating a conference call include receiving from a plurality of participants of a digital audio conference, audio signals from respective audio input circuits for each respective participant. From the received audio signals, a subset of the plurality of participants may be detected, where the subset of the participants qualify as corresponding to loudest audio input as compared to input from a remainder of the plurality of participants. At least one encoder pool may be generated for the remainder of the participants (e.g., those participants not included in the subset qualifying as the loudest) by assigning each of the remainder of the participants to at least one encoder pool associated with a codec used by the respective audio input circuits. In such a manner, each of the remainder of participants may be assigned to an encoder pool based at least on codec used by the respective participant. Similarly, for each participant in the subset of participants (e.g., those participants qualifying as the loudest), digital audio packets of the loudest audio input may be separately encoded to remove feedback. Digital audio packets of the loudest audio input may be separately encoded using the at least one encoder pool. The encoded digital audio packets can be broadcast to the plurality of participants, therein facilitating the digital audio conference.

In other specific example embodiments, conferenced communications may be facilitated via an apparatus comprising a server, including one or more computer processor circuits configured and arranged to provide communications services to endpoint devices of a digital audio conference, where each of the endpoint devices includes a communications circuit. The apparatus further includes one or more non-transitory tangible storage mediums storing a set of instructions that when executed by the one or more computer processor circuits, cause the apparatus to receive from a plurality of endpoint devices included in the digital audio conference, audio signals from respective audio input circuits for each respective endpoint device. Each respective endpoint device may be associated with a different respective participant of the digital audio conference, such that the apparatus may detect from the received audio signals, a subset of the plurality of participants qualified as having loudest audio input as compared to input of a remainder of the plurality of participants. The apparatus may generate at least one encoder pool for the remainder of the participants (e.g., those participants not qualified as having loudest audio input) by assigning each of the remainder of the participants to an encoder pool based on a codec associated with the respective participant. The apparatus may encode digital audio packets for the digital audio conference based on the detected loudest participants, and broadcast the encoded digital audio packets to the plurality of endpoint devices.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
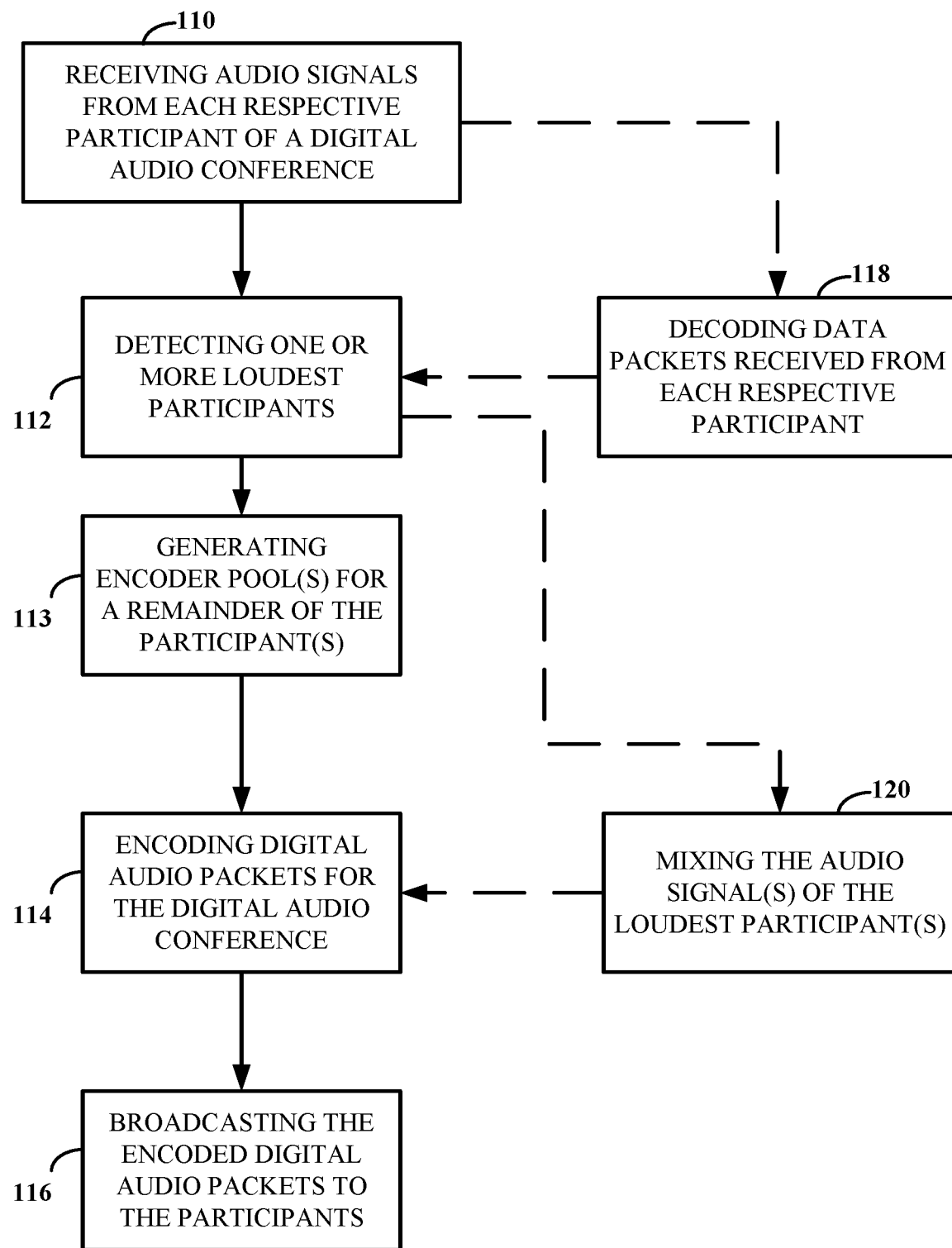
FIG. 1 illustrates an example method for facilitating a conference call, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure involve facilitating conferenced communications using encoder pools. In a more specific example embodiment, certain aspects include receiving from a plurality of participants of a digital audio conference, audio signals from respective audio input circuits for each respective participant. From the received audio signals, a subset of the plurality of participants may be detected, where the subset of the participants qualify as corresponding to loudest audio input as compared to input from a remainder of the plurality of participants. At least one encoder pool may be generated for the remainder of the participants (e.g., those participants not included in the subset qualifying as the loudest) by assigning each of the remainder of the participants to at least one encoder pool associated with a codec used by the respective audio input circuits. In such a manner, each of the remainder of participants may be assigned to an encoder pool based at least on codec used by the respective participant. Similarly, for each participant in the subset of participants (e.g., those participants qualifying as the loudest), digital audio packets of the loudest audio input may be separately encoded to remove feedback. Digital audio packets of the loudest audio input may be separately encoded using the at least one encoder pool. The encoded digital audio packets can be broadcast to the plurality of participants, therein facilitating the digital audio conference.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various example embodiments are directed toward apparatuses and methods for facilitating a conference call among a plurality of participants. Particularly, the loudest participant and/or participants of a conference call may be identified, and the audio of the loudest participants broadcast to the remaining participants of the conference call, such that the audio from all participants is not broadcast. In such a manner, audio quality is improved, as audio signals from all participants is not distributed to all participants. Moreover, various example embodiments are directed toward apparatuses and methods for improving efficiency with encoding audio signals of conference calls by reducing the number of times that the audio signal is encoded. For instance, in an audio conference including twenty participants, if two participants are identified as the loudest participants and the remaining eighteen participants are not (e.g., they are the remaining participants), the audio signals for the two loudest participants may be encoded separately, and the audio signals for the remaining eighteen participants may be separately encoded, such that the audio signal is encoded three times rather than twenty times, thereby reducing the time and computing resources associated with encoding the audio signals. While not necessarily so limited, various aspects may be appreciated through the following discussion of non-limiting examples which use exemplary contexts.

Aspects of the present disclosure are believed to be applicable to a variety of different types of apparatuses (e.g., components, assemblies, circuits, and/or systems) and methods involving facilitating conference calls including a plurality of participants. Particularly, aspects of the present disclosure are directed toward apparatuses and methods for encoding audio for participants in a conference call. Rather than encoding audio for all participants in a conference call, embodiments of the present disclosure include mixing the audio signals from the conference call and then for each participant, removing that participant's audio from the mix such that each participant does not hear his/her own audio. Audio signals may be received from a plurality of participants of a digital audio conference, such as from respective audio input circuits for each respective participant. From the received audio inputs, a loudest participant and/or loudest participants may be detected. Therefore, instead of encoding the mixed audio into packets for each respective participant of the conference call, which can be a cycle intense process, particularly for conference calls including a plurality of participants, the audio from the loudest participant and/or loudest participants may be encoded and broadcast to the remainder of the conference participants, thereby reducing the amount of audio signals encoded for the audio conference.

As such, certain embodiments include detecting from the received audio signals, a subset of the plurality of participants qualified as corresponding to loudest audio input as compared to input from a remainder of the plurality of participants. In various example embodiments, the loudest audio input is attributed to less than all of the participants of the conference call, and in some instances may be a single participant of the conference call.

At least one encoder pool may be generated for a remainder of the participants, such as those participants which are not associated with the loudest audio input. As used herein, an encoder pool refers to or includes a group of communications devices including circuitry capable of communicating voice and/or video signals using a same codec (referring to or including an encoder for coding and/or decoder for decoding a signal that would be expected to include voice and/or video data). In such contexts, one or more codecs may support various voice protocols (e.g., G.711, G.729, G.729A, G.723.1, G.726, G.728, G.722, iLBC, Opus, and/or video protocols such as H.262, H.263, H.264, H.265). Circuit implementation of such codecs, including but not limited to variable rate codecs such as Enhanced Variable Rate CODEC is well known and exemplified in the relevant literature. See, e.g., Standard 3GPP2 C.50014-D entitled "Enhanced Variable Rate Codec, Speech Service Options 3, 68, 70, and 73 for Wideband Spread Spectrum Digital Systems", version 3.0; and A. Spanias, "Advances in speech and audio processing and coding," 2015 6th International Conference on Information, Intelligence, Systems and Applications (IISA), Corfu, 2015, pp. 1-2.

As an illustration, on a conference call with one hundred participants, three participants may be determined to have the loudest audio input, such that the audio input received from communications devices used by those three participants is louder than the audio input received from communications devices used by the remaining ninety seven participants. In this example illustration, at least one encoder pool may be generated for the remaining ninety seven participants (e.g., those participants which are not associated with the loudest audio input). However, the remaining participants (e.g., the remaining 97 participants in the above example) may use different codecs for transmitting and/or receiving audio and/or video signals. Accordingly, each of the remaining participants may be assigned to an encoding pool by assigning each of the remainder of the participants to at least one encoder pool associated with a codec used by the respective audio input circuits. That is, participants associated with a codec that supports the voice protocol G.711 may be assigned to a first encoding pool, while participants associated with a codec that supports the voice protocol G.722 may be assigned to a second encoding pool.

While the participants that are not associated with the loudest audio input are assigned to an encoding pool based on codec, for each participant in the subset of participants deemed the loudest, customized encoded digital audio packets may be generated separately to remove feedback. For instance, if participants A, B, and C are deemed the loudest of the one hundred participants in the conference call, customized encoded digital audio packets may be generated for participant A by removing A's audio signals from the audio stream, such that A does not receive his/her own audio feedback. As another illustration, customized encoded digital audio packets may be generated for participant B by removing B's audio signals from the audio stream, such that B does not receive his/her own audio feedback. Once the encoder pools are established, and the digital audio packets are encoded for the respective participants of the conference call (e.g., the loudest participants as well as the remainder of participants). In response to each of the encoded digital audio packets, the encoded digital audio packets may be broadcast to the plurality of participants, therein facilitating the digital audio conference.

To reduce the cycle intense process of encoding each audio signal for each respective participant of the conference call, a number of different encoding pools may be used. For instance, continuing with the above illustration, a first participant (e.g., participant A) may be identified as among the plurality of participants as being part of the subset of participants having the loudest audio input. A second participant (e.g., participant B) may also be identified as among the plurality of participants as being part of the subset of participants having the loudest audio input. A first encoder pool may be generated for the first participant (e.g., participant A) and a second encoder pool may be generated for the second participant (e.g., participant B). A third encoder pool may be generated for the remainder of the participants (e.g., the remaining 97 participants), where each respective encoder pool includes at least a distinct codec and packetization size. In such example embodiments, generating the at least one encoder pool for the remainder of the participants includes assigning each of the remainder of participants to a non-mixed encoder pool based on a codec and a packetization size for the respective participant.

In various example embodiments, audio signals may be received from respective audio input circuits for each respective participant, including encoded data packets corresponding with the digital audio conference. The encoded data packets may be decoded for each of the plurality of participants, and the decoded data packets may be mixed for the subset of participants. In some examples, prior to encoding the digital audio signals and subsequent to receiving from each of the plurality of participants, encoded data packets corresponding with the digital audio conference, the encoded data packets for each of the plurality of participants may be decoded. The encoded data packets may be decoded such that a mixed raw audio stream can be generated, as described further herein.

In accordance with various embodiments of the present disclosure, audio signals received from the remainder of the participants (e.g., those that are not the loudest) are not broadcast, whereas the audio signals received from the loudest participants are. As such, various example embodiments include mixing the received audio signals of the subset of participants (e.g., the loudest participants) and not the received audio signals from the remainder of the participants. While the decoded audio signals for the first participant and the second participant are mixed prior to broadcast to the plurality of conference call participants, audio signals for the remainder of the participants are not mixed. As discussed previously, the audio signals from those participants not deemed the loudest are not decoded, and consequently not mixed, thereby reducing the amount encoding for distribution of the audio and/or video content to the conference call participants. In order to determine if a participant is one of the loudest, the audio should be decoded (to get the audio loudness) or additional out-of-band accompanying information (e.g. RFC 6464), if present, should be obtained from the client to determine the loudness of the audio in that packet.

Additional example embodiments are directed toward an apparatus comprising a server, including one or more computer processor circuits configured and arranged to provide communications services to endpoint devices of a digital audio conference, each of the endpoint devices including a communications circuit. In such examples, the apparatus includes one or more non-transitory tangible storage mediums storing a set of instructions that when executed by the one or more computer processor circuits, cause the apparatus to receive from a plurality of endpoint devices included in the digital audio conference, audio signals from respective audio input circuits for each respective endpoint device. As described herein, each respective endpoint device may be associated with a different respective participant of the digital audio conference.

The one or more non-transitory tangible storage mediums can store a set of instructions that when executed by the one or more computer processor circuits, cause the apparatus to detect from the received audio signals, a subset of the plurality of participants qualified as having loudest audio input as compared to input of a remainder of the plurality of participants. Moreover, the set of instructions, when executed by the one or more computer processor circuits, may cause the apparatus to generate at least one encoder pool for the remainder of the participants by assigning each of the remainder of the participants (e.g., those participants not identified as having loudest audio input) to an encoder pool based on a codec associated with the respective participant. The set of instructions, when executed by the one or more computer processor circuits, can cause the apparatus to encode digital audio packets for the digital audio conference based on the detected loudest participants, and as described herein, the encoded digital audio packets may be broadcast to the plurality of endpoint devices.

In various example embodiments, the apparatus is configured to receive from each of the plurality of endpoint devices, encoded data packets corresponding with the digital audio conference. The encoded data packets received from each of the plurality of endpoint devices may be decoded, and the apparatus can mix the decoded data packets for the subset of the participants. The data packets from the loudest participants may be mixed, and a plurality of encoder pools may be identified. As such, the apparatus may be configured to identify a first participant as being part of the subset of participants with the loudest audio input, and to access an encoder pool of the first participant. As an illustration, the apparatus may access data storage to identify a codec associated with the first participant such that the audio signals for the first participant may be encoded. For instance, the apparatus may encode the digital audio packets for the first participant by adding a next payload for the first participant to a set of encoded payloads for the encoder pool of the first participant, responsive to a determination that the next payload is not already encoded in the encoder pool. Similarly, a different (e.g., second) participant may be identified as one of the remainder of participants not having a loudest audio input. The apparatus can access an encoder pool of the second participant, and encode the digital audio packets for the second participant by adding a next payload for the second participant to a set of encoded payloads for the encoder pool of the second participant, responsive to a determination that the next payload is not already encoded in the encoder pool.

Various embodiments herein describe identifying a loudest participant and/or loudest participants of a conference call. However, the identification of the loudest participant and/or loudest participants of the conference call may be dynamic, during the course of the conference call. For instance, in certain embodiments, the apparatus is configured to detect from the audio signals received at a first time point, one or more loudest participants at the first time point, and to detect from the additional audio signals received at a second time point, a subset of the plurality of participants having a loudest audio input at the second time point. The loudest participants at the second point in time may be the same as the loudest participants at the first point in time, or they may be different. As such, the apparatus is configured to encode digital audio packets for the audio signals received at the first time point based on the subset of participants at the first time point, and encode digital audio packets for the audio signals received at the second time point based on the subset of participants at the second time point.

In various example embodiments, the received audio signals, qualified as having loudest audio, may be combined into a mixed audio signal. Digital audio packets may be encoded separately into respective encoded audio groups for receipt by each of the respective endpoint devices associated with the participants in the subset of loudest participants. As described herein, the mixed audio signal is modified as having audio signal feedback to each qualified participant removed and by using dedicated encoder pools for each qualified participant. For instance, the mixed audio signal to be received by participant A (one of the loudest participants) may be modified as having audio signal feedback from participant A removed, and the mixed audio signal to be received by participant B (another one of the loudest participants) may be modified as having audio signal feedback from participant B removed. At least one other encoder pool may be used to encode digital audio packets, corresponding to the mixed audio signal, for sending to the remainder of the plurality of participants.

To provide a dynamic and customizable solution, the apparatus may be configured to receive as input, a selection of a number of loudest participants to be detected from the received audio signals, and detect the loudest participants based on the selection. For instance, a user of a conference call solution implementing the various embodiments described herein, may specify that the five loudest participants are to be detected from the received audio signals. As another illustration, the user may specify that the three loudest participants are to be detected.

Accordingly, the apparatus may provide, as part of the communications services provided to the endpoint devices of the digital audio conference, a purchasable option to specify the number of loudest participants to be detected from the received audio signals. As part of the communications services provided to the endpoint devices of the digital audio conference, administrative capabilities may be provided to change the number of loudest participants to be detected from the received audio signals during the digital audio conference. For instance, the administrative capabilities may allow the user to change the selection of the number of loudest participants to be detected, during the course of a pending conference call.

Turning now to the figures, FIG. 1 illustrates an example method for facilitating a conference call, in accordance with the present disclosure. At 110, the method includes receiving from a plurality of participants of a digital audio conference, audio signals from respective audio input circuits for each respective participant. As described herein, audio signals may be received from each respective participant, but a subset of the participants may be identified as the loudest, such that the audio input received from communications devices used by those participants is the loudest as compared to the audio input received from the remainder of the participants. In some example embodiments, the number of participants to be identified as being the loudest may dynamically change. For instance, administrative capabilities may allow a user to specify that the three loudest participants should be identified, and at another time, the administrative capabilities may allow the user to specify that the eight loudest participants should be identified.

At 112, the method includes detecting from the received audio signals, a subset of the plurality of participants qualified as corresponding to loudest audio input as compared to input from a remainder of the plurality of participants. The identification of the loudest participant may also be dynamic. For instance, at a first time point, participants A, B, and C may be identified as the loudest participants, whereas at a second time point, participants D, E, and F may be identified as the loudest participants. In various example embodiments, encoded data packets corresponding with the digital audio conference can be received from each of the plurality of participants, and the encoded data packets may be decoded for each of the plurality of participants, at 118. However, in various embodiments, the encoded data packets received from the identified loudest participants may be decoded, while encoded data packets received from the remainder of the participants are not.

At 113, the method includes generating at least one encoder pool for the remainder of the participants by assigning each of the remainder of the participants to at least one encoder pool associated with a codec used by the respective audio input circuits. As described herein, each participant may be assigned to an encoder pool based on a distinct codec and packetization size supported by the communications device associated with the participant. For instance, if participants D, E, and F each use a same codec and packetization size to send and receive audio and/or video signals, the participants D, E, and F may be assigned to a same encoder pool. Conversely, if participants G, H, and I use a different codec and/or packetization size as compared to participants D, E, and F, then participants G, H, and I may be assigned to a different respective encoder pool than participants D, E, and F.

At 114, the method includes encoding digital audio packets for the digital audio conference. For instance, for each participant in the subset of loudest participants, digital audio packets of the loudest audio input may be separately encoded to remove feedback. For instance, the audio input for a first loudest participant may be customized to remove the audio feedback from the first loudest participant, and the audio input for a second loudest participant may be customized to remove the audio feedback from the second loudest participant. Additionally, as described herein, digital audio packets of the loudest audio input may be separately encoded using the at least one encoder pool for receipt by each of the remainder of participants (e.g., those that are not the loudest participants of the conference call).

In various example embodiments, at 120, the method includes mixing the audio signals of the loudest participant or participants. For instance, as described further with regards to FIG. 4, in embodiments where more than one participant is identified as being the loudest on the conference call, the audio input from the loudest participants may be mixed such that a combined raw audio signal is encoded for receipt by the remainder of the participants. At 116, the method includes causing a broadcast to the plurality of participants in response to each of the encoded digital audio packets, and therein facilitating the digital audio conference.

Figure 2:
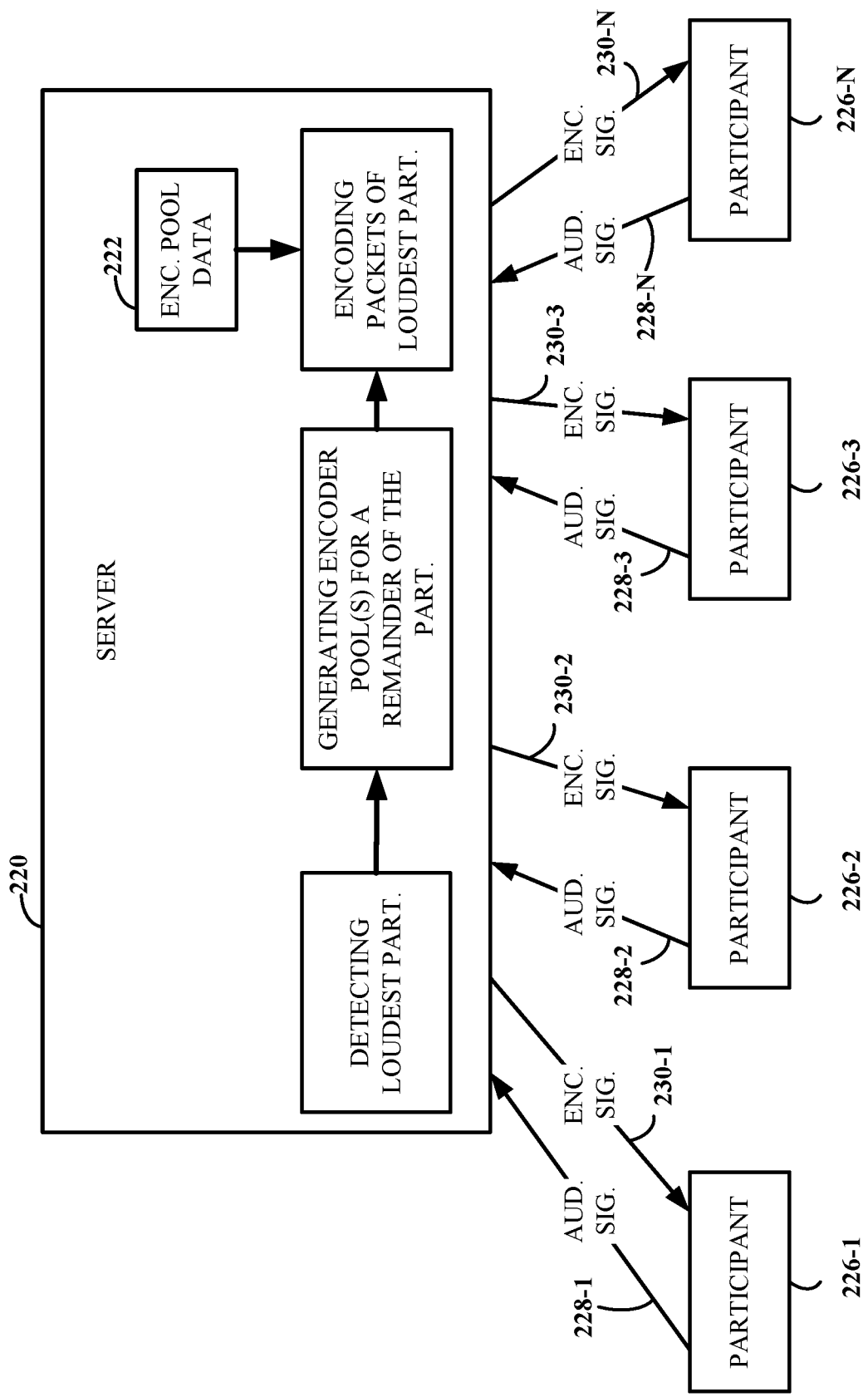
FIG. 2 illustrates an example system for facilitating a conference call, in accordance with the present disclosure.

FIG. 2 illustrates an example system for facilitating a conference call, in accordance with the present disclosure. As illustrated in FIG. 2, the system includes a server 220, including one or more computer processor circuits configured and arranged to provide communications services to endpoint devices 226-1, 226-2, 226-3, 226-N (collectively referred to herein as endpoint devices 226) of a digital audio conference, each of the endpoint devices including a communications circuit. In various example embodiments, the server 220 may include one or more non-transitory tangible storage mediums that stores a set of instructions that when executed by the one or more computer processor circuits, cause the apparatus to receive from a plurality of endpoint devices 226 included in the digital audio conference, audio signals 228-1, 228-2, 228-3, 228-N (collectively referred to herein as audio signals 228) from respective audio input circuits for each respective endpoint device, wherein each respective endpoint device is associated with a different respective participant of the digital audio conference. For instance, in the embodiment illustrated in FIG. 2, endpoint 226-1 is associated with participant 1, endpoint 226-2 is associated with participant 2, endpoint 226-3 is associated with participant 3, and endpoint 226-N is associated with participant N. While FIG. 2 illustrates four endpoint devices, each associated with a different respective participant, it is noted that more or fewer participants may be included in the digital conference call, in accordance with the present disclosure.

Each of the plurality of endpoint devices 226 may send audio signals to the server 220. For instance, endpoint 226-1 can send to server 220, audio signal 228-1, whereas endpoint 226-2 can send to server 220, audio signal 228-2. Endpoint 226-3 and endpoint 226-N can send to server 220, audio signals 228-3 and 228-N, respectively. Responsive to receipt of the audio signals the server 220 can detect from the received audio signals 228, a subset of the plurality of participants qualified as having loudest audio input as compared to input of a remainder of the plurality of participants. For instance, the server 220 can detect that participant 1, associated with endpoint 226-1 and participant 2, associated with endpoint 226-2, have the loudest audio input as compared to participant 3 (e.g., endpoint 226-3) and participant N (e.g., endpoint 226-N). The server 220 can subsequently encode packets of the loudest participants, separately from the remainder. For instance, the server 220 can generate at least one encoder pool for the remainder of the participants (e.g., for participant 3 and participant N in the above example) by assigning each of the remainder of the participants to an encoder pool based on a codec associated with the respective participant. Similarly, the server 220 can encode digital audio packets for the digital audio conference based on the detected loudest participants, as discussed further with regards to FIG. 3. Once the encoded digital audio packets are generated, the encoded audio signals 230-1, 230-2, 230-3, and 230-N may be broadcast to the plurality of participants 226. For instance, encoded signal 230-1 may be broadcast to participant 226-1, encoded signal 230-2 may be broadcast to participant 226-2, encoded signal 230-3 may be broadcast to participant 226-3, and encoded signal 230-N may be broadcast to participant 226-N.

In some example embodiments, the server 220 can identify a first participant (such as participant 226-1) as being part of the subset of participants, and server 220 can access an encoder pool 222 of the first participant, and encode the digital audio packets for the first participant by adding a next payload for the first participant to a set of encoded payloads for the encoder pool of the first participant, responsive to a determination that the next payload is not already encoded in the encoder pool.

Figure 3:
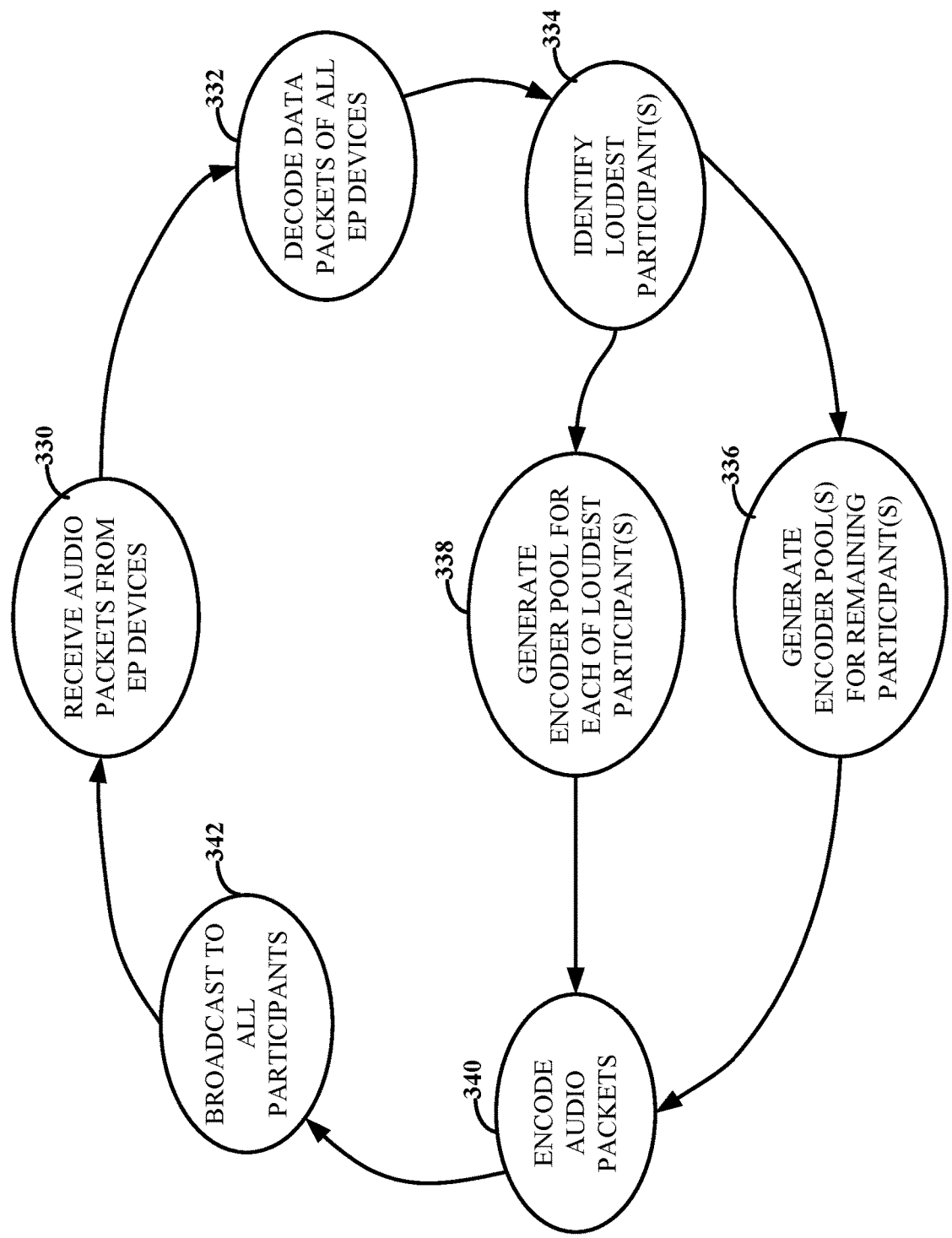
FIG. 3 further illustrates an example process diagram for facilitating a conference call, in accordance with the present disclosure.

FIG. 3 further illustrates an example process diagram for facilitating a conference call, in accordance with the present disclosure. At 330, the process includes receiving audio packets from endpoint devices. For instance, audio packets may be received from a plurality of conference-participating endpoint devices. As described herein, receiving from each of the plurality of participants, may include receiving encoded data packets corresponding with the digital audio conference. At 332, the process includes decoding the encoded data packets for each of the plurality of participants. In some example embodiments, data packets received from the loudest participants of the conference call may be decoded. From the decoded data packets, a loudest participant or loudest participants can be identified at 334. The number of participants identified as the loudest may be dynamic, as specified by an administrator. Additionally, the identification of the loudest participant and/or loudest participants may be dynamic, such that the loudest participant or participants at one point in time may differ from the loudest participant or participants at a second point in time.

Once the loudest participant or loudest participants are identified, an encoder pool or encoder pools can be generated for each of the loudest participants at 338, and an encoder pool or encoder pools can be generated for the remaining participant or participants at 336. For instance, given a conference of m participants $P_1, P_2, \ldots, P_m$, the loudest n participants $P_{L1}, P_{L2}, \ldots, P_{Ln}$ may be identified. The audio signals from the loudest n participants $P_{L1}, P_{L2}, \ldots, P_{Ln}$ may be mixed, as described herein. Where the x=m−n non-mixed participants $P_{X1}, P_{X2}, \ldots, P_{Xx}$ use k distinct codecs and packetizations $CP_1, CP_2, \ldots, CP_k$, a number of encoder pools may be generated. As used herein, an encoder pool refers to or includes identification of a codec, a packetization size, the state retained between encoding the audio for successive payloads, and a set of already encoded payloads for each of the participants in an encoder pool. In such example, there would be n+k encoder pools for the conference. Each loudest participant $P_{Li}$ belongs to its own encoder pool since the audio sent back to that participant is different from that sent to any other participant (i.e. the full mix of $P_{L1}, P_{L2}, \ldots, P_{Ln}$ minus $P_{Li}$ itself since $P_{Li}$ should not receive an echo of his/her own audio). This results in n encoder pools. Each non-mixed participant $P_{Xi}$ likewise belongs to an encoder pool determined by that participant's codec and packetization, which results in k encoder pools.

Certain information for each member of an encoder pool may also be retained either by the encoder pool or by the member which encoded the payload in the encoder pool. For instance, information such as a next transmission real-time transport protocol (RTP) sequence number for the participant, and/or a next transmission RTP timestamp for the participant may be included in the encoder pool. Once the encoder pools are created for each of the loudest and remaining participant(s), the audio packets for the participants may be encoded. For instance, when it is time to send an audio packet to one of the loudest participants $P_{Li}$, then its encoder pool is accessed. If the next payload for PLA is not already encoded, then it is encoded at 340 and added to the set of encoded payloads for that encoder pool. The payload is then copied into a packet and the RTP sequence number and timestamp is filled in, and the encoded data packet is sent (e.g., broadcast) to the loudest participant (e.g., PLO at 342. Since this encoder pool has only one participant it may not be necessary to maintain the set of encoded payloads, but set of encoded payloads may be maintained so that this encoder pool is implemented exactly the same as a non-mixed participant encoder pool. Similarly, when it is time to send an audio packet to one of the non-mixed participants $P_{Xi}$, then its encoder pool is accessed. If the next payload for $P_{Xi}$ is not already encoded then it is encoded at 340 and added to the set of encoded payloads for that encoder pool. The payload is then copied into a packet and the RTP sequence number and timestamp is filled in. The encoded data packet is then sent (e.g., broadcast) for $P_{Xi}$ at 342. Encoded payloads are removed from an encoder pool when all participants in that pool have sent them.

Figure 4:
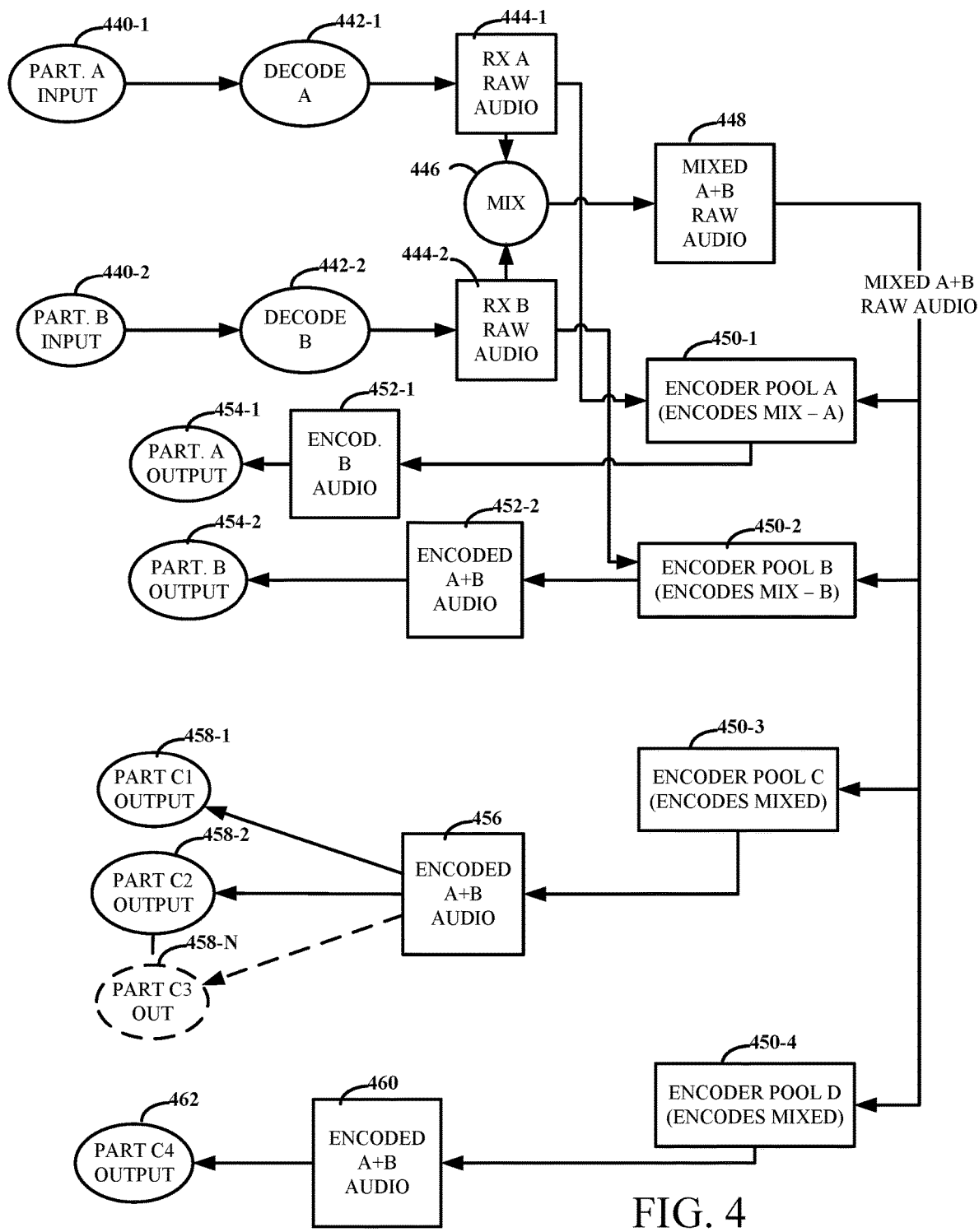
FIG. 4 illustrates an example system for facilitating a conference call, in accordance with the present disclosure.

FIG. 4 illustrates an example system for facilitating a conference call, in accordance with the present disclosure. In the example illustrated in FIG. 4, participant A and participant B are identified as being the loudest participants of the conference call (as compared to participants C1, C2, C3, and C4). As the audio inputs from participants C1, C2, C3, and C4 are not the loudest participants, the audio input signals from those participants are not considered when generating the mixed audio signal, and are therefore not illustrated in FIG. 4.

Audio input is received from participant 440-1 and 440-2 (such as by server 220 illustrated in FIG. 2). The audio input signals received from participants 440-1 and 440-2 are decoded at 442-1 and 442-2. As an illustration, 442-1 decodes the audio from participant 440-1 and 442-2 decodes the audio from participant 440-2. In the example embodiment illustrated, the raw audio from participant 440-1 (e.g., raw A audio 444-1) is then mixed with the raw audio from participant 440-2 (e.g., raw B audio 444-2) by mixer 446. The resulting signal is mixed A+B raw audio 448.

The mixed A+B raw audio signal 448 may be sent to the encoder pools for each of the participants (e.g., both the loudest participants A and B, as well as the remainder of the participants C1, C2, C3, and C4). For instance, the mixed A+B raw audio 448 can be sent to encoder pool A, which encodes the mixed A+B raw audio with the audio from participant A removed (e.g., encoder pool A 450-1). As such, the encoder pool A 450-1 can also receive the raw A audio 444-1, such that the signal can be removed from the mixed A+B raw audio. Similarly, the mixed A+B raw audio 448 can be sent to encoder pool B, which encodes the mixed A+B raw audio with the audio from participant B removed (e.g., encoder pool B 450-2). The encoder pool B 450-2 can receive the raw B audio 444-2, such that the signal can be removed from the mixed A+B raw audio. Using the encoder pool data from encoder pool A 450-1, buffer 452-1 may encode audio from participant B 440-2 for receipt by participant A. As such, the output 454-1 for participant A corresponds with the audio from the other loudest participant, participant B. Similarly, using the encoder pool data from encoder pool B 450-2, buffer 452-2 may encode audio from participant A 440-1 for receipt by participant B. As such, the output 454-2 for participant B corresponds with the audio from the other loudest participant, participant A.

In the example embodiment illustrated in FIG. 4, participants C1, C2, C3, and C4 are identified as not having a loudest audio input. Accordingly, the remainder of participants (e.g., C1, C2, C3, and C4) may be assigned to encoder pools as described herein. The mixed A+B raw audio 448 may be encoded for each of the respective encoder pools. For instance, participants C1, C2, and C3 may be assigned to a same encoder pool (e.g., encoder pool C 450-3), based on codec and packetization size as described herein. Participant C4 may be assigned to a different encoder pool (e.g., encoder pool D 450-4) based on codec and packetization size. It is noted that more or fewer participants may be assigned to a respective encoder pool, as denoted by the dashed line corresponding with participant C3. Similarly, more or fewer participants may be assigned to encoder pool D, although not illustrated in FIG. 4.

Using the mixed A+B raw audio 448 and encoder pool C, buffer 456 may encode the output 458-1 for receipt by participant C1. For instance, when C1, C2, or C3 need audio output then encoder pool C 450-3 provides that output by first checking if that encoded audio is not yet in buffer 456. If the encoded audio is not in buffer 456, then encoder pool C 450-3 encodes the audio and stores the encoded audio into buffer 456. Next, once the encoded audio is in buffer 456, buffer 456 provides the encoded audio to the applicable participant. For instance, if participant C1 458-1 needed the encoded audio, buffer 456 would provide the encoded audio to participant C1 458-1, and would leave the encoded audio in the buffer for the next of C1, C2, C3 that needed it. Once all members of the encoder pool have used a particular piece of encoded audio then it is removed from the buffer 456. As such, a piece of audio data sent to C1, C2 and C3 is encoded once rather than three times (e.g., once for C1, once for C2, and once for C3). While encoder pool C 450-3 is used to encode the output for participants C1, C2, and C3, encoder pool D 450-4 is used to encode the output for participant C4. As such, using the raw A+B audio 448 and encoder pool 450-4, buffer 460 may encode output 462 for receipt by participant C4. In such a manner, the number of signals encoded for participants of the conference call is greatly reduced, thereby simplifying the cycle intense process of encoding audio signals of a conference call, particularly in systems different codecs are used among participants of the conference call.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as device, system, and/or other circuit-type depictions (e.g., reference numerals 220, 226-1, 226-2, 226-3, 226-N, 222, and 224 of FIG. 2, and reference numerals 446, 452-1, 452-2, 456, and 460 of FIG. 4 depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1, 3, and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with regards to FIG. 1 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first endpoint device", a "second endpoint device", etc., where the endpoint device might be replaced with terms such as "circuit", "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to . . . " is interpreted as "circuit configured to . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, more or fewer participants may be involved in a conference call, as illustrated in FIG. 4, and more or fewer participants may be identified as a loudest participant. As another example, all data packets received from participants of a conference call may be decoded as illustrated in FIG. 3, or only data packets received from the loudest participants may be decoded, as described herein. Such modifications do not depart from the true spirit and scope of various aspects of the disclosure, including aspects set forth in the claims.

What is claimed is:

1. An apparatus comprising:
   a logic circuit to process communications involving endpoint devices of a digital audio conference, each of the endpoint devices including a communications circuit enabled to convey communications involving one or more users; and the logic circuit also to:
   process different audio signals via respective input circuits respectively associated with each of the endpoint devices, wherein in response to a subset of the different audio signals deemed or qualified as having a loudest audio input as compared to other ones of the different audio signals, each of the other ones of the different audio signals is assigned to or associated with an encoder pool based on a codec associated with the digital audio conference; and
   encode digital audio packets for the digital audio conference associated with the subset of the different audio signals deemed or qualified as having a loudest audio input and broadcasting audio.

2. The apparatus of claim 1, further including data processing circuitry to prepare the encoded digital audio packets for broadcast.

3. The apparatus of claim 2, wherein the broadcast is directed to at least some of the endpoint devices and associated with the digital audio conference, and wherein the data processing circuitry to prepare is coupled to or part of the logic circuit.

4. The apparatus of claim 1, further including an audio speaker communicatively coupled to the logic circuit for broadcasting audio based on the encoded digital audio packets.

5. The apparatus of claim 1, further including a speaker to broadcast audio corresponding to the encoded digital audio packets.

6. The apparatus of claim 1, further including circuitry to separately encode digital audio packets for the digital audio conference associated with the subset of the different audio signals not deemed or qualified as having a loudest audio input.

7. The apparatus of claim 1, further including:
   a control circuit for causing broadcasting of selected audio based on the encoded digital audio packets, and
   encoding circuitry to separately encode digital audio packets for the digital audio conference associated with the subset of the different audio signals not deemed or qualified as having a loudest audio input.

8. The apparatus of claim 7, wherein the control circuit is to cause audio based on the separately encoded digital audio packets not to be broadcast.

9. The apparatus of claim 1, further including signal-mixing circuitry to mix or combine signals associated with the subset of the different audio signals deemed or qualified as having a loudest audio input.

10. The apparatus of claim 1, further including signal-mixing circuitry to combine signals associated with the subset of the different audio signals deemed or qualified as having a loudest audio input.

11. The apparatus of claim 1, wherein the logic circuit is not to prepare broadcast signals associated with the other ones of the different audio signals which are not deemed or qualified as having a loudest audio input.

12. The apparatus of claim 1, wherein the logic circuit is configured, for the other ones of the different audio signals which are not deemed or qualified as having a loudest audio input, to remove feedback.

13. A method comprising:
processing communications, by use of a logic circuit, involving endpoint devices of a digital audio conference, each of the endpoint devices including a communications circuit enabled to convey communications involving one or more users;
processing different audio signals via respective input circuits respectively associated with each of the endpoint devices, wherein in response to a subset of the different audio signals deemed or qualified as having a loudest audio input as compared to other ones of the different audio signals, each of the other ones of the different audio signals is assigned to or associated with an encoder pool based on a codec associated with the digital audio conference;
encode digital audio packets for the digital audio conference associated with the subset of the different audio signals deemed or qualified as having a loudest audio input; and
via broadcast preparation circuitry, preparing the encoded digital audio packets for broadcast.

14. The method of claim 13, further including broadcasting via a speaker.

15. The method of claim 13, further including broadcasting directed to at least some of the endpoint devices.

16. The method of claim 13, further including using an audio speaker communicatively coupled to the logic circuit for broadcasting audio based on the encoded digital audio packets.

17. The method of claim 13, further including broadcasting audio corresponding to the encoded digital audio packets.

18. The method of claim 13, further including separately encoding digital audio packets for the digital audio conference associated with the subset of the different audio signals not deemed or qualified as having a loudest audio input.

19. The method of claim 13, further including signal-mixing circuitry to mix or combine signals associated with the subset of the different audio signals deemed or qualified as having a loudest audio input.

20. The method of claim 13, further including signal-mixing circuitry to mix or combine signals associated with the subset of the different audio signals deemed or qualified as having a loudest audio input, and using the logic circuit to prevent mixing of signals associated with the other ones of the different audio signals not deemed or qualified as having a loudest audio input.

21. The method of claim 13, further including using a control circuit for causing broadcasting of selected audio based on the encoded digital audio packets, while causing audio associated with the other ones of the different audio signals not deemed or qualified as having a loudest audio input, not to be broadcast.

22. The apparatus of claim 1, further including signal-mixing circuitry to combine signals associated with certain of the signals deemed or qualified as having a loudest audio input, and wherein the signals associated with the other ones of the signals, which are not deemed or qualified as having a loudest audio input, are not to be combined by the signal-mixing circuitry.

\* \* \* \* \*